United States Patent [19]

Inoue et al.

[11] Patent Number: 6,035,075
[45] Date of Patent: Mar. 7, 2000

[54] IMAGE DEFORMING METHOD AND APPARATUS

[75] Inventors: Akira Inoue; Johji Tajima, both of Tokyo; Yoichi Sato, Kanagawa, all of Japan

[73] Assignee: NEC Corporation, Tokyo, Japan

[21] Appl. No.: 09/057,576

[22] Filed: Apr. 9, 1998

[30] Foreign Application Priority Data

Apr. 10, 1997 [JP] Japan .................................. 9-092499

[51] Int. Cl.[7] .................................................. G06K 9/20
[52] U.S. Cl. .......................................... 382/282; 382/293
[58] Field of Search ................................... 382/282, 293, 382/295, 298, 300, 276

[56] References Cited

U.S. PATENT DOCUMENTS

| | | | |
|---|---|---|---|
| 4,014,000 | 3/1977 | Uno et al. | 382/209 |
| 5,193,126 | 3/1993 | Matsuki | 382/298 |
| 5,768,413 | 6/1998 | Levin et al. | 382/173 |
| 5,825,947 | 10/1998 | Sasaki et al. | 382/287 |
| 5,907,640 | 5/1999 | Delean | 382/276 |

FOREIGN PATENT DOCUMENTS

| | | |
|---|---|---|
| 1-246675 | 10/1989 | Japan . |
| 2-292682 | 12/1990 | Japan . |
| 5-127654 | 5/1993 | Japan . |
| 7-192122 | 7/1995 | Japan . |
| 9-106453 | 4/1997 | Japan . |

*Primary Examiner*—Yon J. Couso
*Attorney, Agent, or Firm*—Whitham, Curtis & Whitham

[57] ABSTRACT

In an image deforming method and an image deforming apparatus, a portion of an input image is geometrically deformed to be outputted therefrom. Input and output image buffers keep input and output image data items, respectively. An image deforming method and a partial deformation region are specified in an image deformation specification unit. For each pixel of the output image, a before-deformation coordinate value calculating section calculates coordinate values thereof before the deformation. A shift calculating section calculates a coordinate shift amount expressing a quantity of shift for each pixel of the output image between coordinate values of the pixel and those of the pixel before the deformation, and the coordinate shift amount is stored in a pixel reallocation map storage in the form of a pixel reallocation map. While reallocating pixels in accordance with the shift amount in the storage, a partial pixel deforming unit transfers values of the pixels from the input image buffer to the output image buffer.

8 Claims, 10 Drawing Sheets

IMAGE DEFORMING METHOD AND APPARATUS

BACKGROUND OF THE INVENTION

The present invention relates to an image deforming method and an image deforming apparatus for use in a digital image editing system used for the desktop publishing (DTP) and the like, and in particular, to an image deforming method and an image deforming apparatus in which a portion of an image inputted thereto is geometrically deformed to be outputted at a high speed.

DESCRIPTION OF THE RELATED ART

The DTP is used at present to produce printed matter by small-sized computers such as a personal computer and a workstation.

To prepare items for presentation and/or posters in the DTP field, there is utilized processing to freely deform a plurality of images on a background to produce a combined or synthesized image. In the processing, the deformation of images is repeatedly conducted together with the other elements such as the background and letters in a try-and-error fashion. In the operation, a portion of the original image is deformed in many cases.

Conventionally, there has been an image deforming apparatus which conducts image deformation from a coordinate system (x, y) into a coordinate system (x', y') in accordance with a polynomial of higher degree. For example, in accordance with the Japanese Patent Application Serial No. 2-292682, there is carried out an example of this operation, i.e., correction of distortion. This correction employs the following expressions for the conversion from the (x, y) system into the (x', y') system.

$$u = [x^n \cdots 1][A]\begin{bmatrix} y^m \\ \cdots 1 \end{bmatrix} \quad (1)$$

$$v = [x^n \cdots 1][B]\begin{bmatrix} y^m \\ \cdots 1 \end{bmatrix} \quad (2)$$

In the expressions, n and m stand for positive integers and [A] and [B] are (n+1)×(m+1) matrices of deformation coefficients. In short, these expressions represent a general polynomial deformation. In accordance with the invention disclosed in the Japanese Patent Application Serial No. 2-292682, several values of coordinate points before and after conversion are assigned to the expressions to attain [A] and [B] and then the conversion processing is accomplished equally for all pixels.

Moreover, in accordance with the Japanese Patent Application Serial No. 7-192122 disclosing an image deforming apparatus, the overall image is horizontally and vertically subdivided into n×m pieces or small regions such that the image deformation is conducted by arbitrarily moving grid points for subdivision. In this situation, the conversion represented by expressions (1) and (2) is conducted only for data of grid points associated with deformation. Which resultantly increases the processing speed. Additionally, pixels in a small frame formed with grid points are assumed to be interpolated with pixel values of points of the square.

However, the conventional image deforming apparatus has not been configured in consideration of an operation in which the deformation is partially achieved in an image. In consequence, for the partial deformation, the deformation processing is required to be conducted for the entire image. This leads to a problem that the processing time becomes elongated.

In the image deforming apparatus described in the Japanese Patent Application Serial No. 7-192122, it is possible to deform only a portion of an image by adjusting values of coordinates of grid points. On the other hand, the apparatus is attended with a problem of lack of smoothness in the deformation.

For example, to conduct a partial magnifying operation with an effect obtained when a portion of an image is viewed through a concave or convex lens, the user is required to set parameters of complex grid points. It is quite difficult for the user to appropriately set these parameters. Therefore, to ordinarily conduct the deformation only for a portion of an image, it is necessary to first separate the portion from the image to deform the portion according to expressions (1) and (2) so as to combine the deformed portion with the original image thereafter. This leads to a difficulty of minimization of the processing time.

On the other hand, during the try-and-error procedure in the image deformation, there often occurs a case in which the position of the partial deformation is desired to be changed in the image. In the conventional apparatus, the processing to deform a new image is carried out in such a case. This requires a long period of time for calculation and hence leads to a problem that the processing time becomes longer.

SUMMARY OF THE INVENTION

It is therefore an object of the present invention, which has been devised to remove the problems above, to provide an image deforming method and an image deforming apparatus in which a portion of an image inputted thereto can be deformed and outputted therefrom at a high speed.

To achieve the object in accordance with a first aspect of the present invention, there is provided an image deforming method comprising the steps of specifying a position and a size of a partial deformation zone in an image, the partial deformation zone being to be partially deformed; selecting a deformation pattern from one or more deformation patterns each representing a deformation pattern for the partial deformation; creating in accordance with the deformation pattern a pixel reallocation map including records, each of the records including a relative distance between coordinate values of each pixel before the partial deformation and those of the pixel thereafter; and replacing pixels in the partial deformation zone in accordance with the pixel reallocation map.

In accordance with the first aspect, for each pixel of an image to be deformed in relation to a specified deformation pattern, the relative distance between the values of coordinates of the pixel before conversion and those of the pixel after conversion is calculated in the form of a pixel reallocation map. Therefore, when a partial deformation is to be accomplished for the image, the correspondence between the coordinate values respectively before and after conversion can be appropriately obtained, which advantageously increases the processing speed of image deformation.

In accordance with a second aspect of the present invention, there is provided an image deforming apparatus comprising an input image buffer for keeping therein input image data, an output image buffer for keeping therein an output image data, an image deformation specifying unit for specifying an image deforming method and a partial deformation zone, a before-deformation coordinate value calculating section for calculating coordinate values of each pixel before the deformation for the output image, a shift calculating section for calculating a quantity of coordinates representing a quantity of shift between coordinate values of each pixel of the output image and those of the pixel before the deformation, a pixel reallocation map storage section for keeping therein the shift of coordinates in the form of a pixel reallocation map, and partial pixel deforming means for reallocating pixels in accordance with the quantity of coordinate shift stored in the storage section and transferring values of the pixels from the input image buffer to the output image buffer.

Consequently, in accordance with the second aspect of the present invention, the image data of the input image to be partially deformed is kept retained, and the image deforming method and region are specified. Furthermore, the values of coordinates of pixels before conversion are calculated in the partial deformation region, and the quantity or amount of shift of pixels, i.e., changes in coordinate values thereof are kept in an image reallocation map. Consequently, while pixels are being reallocated, the values thereof can be easily transferred from the input image buffer to the output image buffer, which makes it possible to accomplish the partial image deformation at a high speed.

In accordance with a third aspect of the present invention, the image deformation specifying unit in accordance with claim 2 includes partial deformation region specifying means including position specifying means for specifying a position in an image in the partial deformation region and size specifying means for specifying a size of the region, deformation pattern specifying means for specifying a deformation pattern selected from a plurality of deformation patterns, each of the patterns representing a deformation method of the image; and user parameter specifying means for specifying as user parameters deformation parameters of the specified deformation pattern. The before-deformation coordinate value calculating section includes a coordinate conversion unit for conducting, when before-deformation coordinates (x, y) are moved to coordinates (x', y') after the deformation, a coordinate conversion represented by $F^{-1}$ for which (x, y)=$F^{-1}$(x', y') holds.

In accordance with the third aspect of the present invention, the advantage of the second aspect can be obtained. Moreover, there can be easily attained the position and size of the partial deformation region in the image. In consequence, the image can be more precisely deformed, and the values of coordinates before conversion can be obtained in accordance with those after conversion.

In accordance with a fourth aspect of the present invention, in the image deformation of claim 3, the coordinate conversion section of the before-deformation coordinate value calculating section includes the first to n-th coordinate converting units (n is an integer equal to or more than one) respectively conducting deformations corresponding to deformation patterns which can be specified. Additionally, the deformation coordinate value calculating section includes the coordinate conversion selecting section to select one of the n conversions associated with the n conversion sections.

Consequently, in accordance with the fourth aspect of the present invention, the advantageous effect of claim 3 is attainable. Furthermore, thanks to one or more deformation patterns for the partial deformation, it is possible to select a more suitable deformation pattern.

In accordance with a fifth aspect of the present invention, the coordinate conversion section of claim 3 or 4 includes a coordinate conversion unit employing a polynomial of higher degree to conduct a coordinate conversion represented as follows.

$$x = \sum_{i=0}^{m}\sum_{j=0}^{n}(a_{ij}(x'))^i(y')^j$$

$$y = \sum_{i=0}^{m}\sum_{j=0}^{n}(b_{ij}(x'))^i(y')^j$$

Consequently, in accordance with the fifth aspect of the present invention, the advantage of claim 3 or 4 is obtained and the coordinates are converted according to a higher-degree polynomial conversion.

In accordance with a sixth aspect of the present invention, the coordinate conversion section of one of claims 3 to 5 includes a coordinate converting unit using an elliptic lens to conduct an arithmetic operation for coordinate conversion in accordance with $$x = n \times (cx + (x' - cx) \times t^2) + (1 - n) \times x'$$

$$y = n \times (cy + (y' - cy) \times t^2) + (1 - n) \times y'$$

$$t^2 = \frac{(x' - cx)^2}{R_a^2} + \frac{(y' - cy)^2}{R_b^2}$$

$$n = (1.0 - t) \times \alpha \quad (t \geq 0)$$

where, (cx, cy) designates coordinates of a center of the lens, Ra indicates a radius of the ellipse in the x-axis direction. Rb denotes a radius of the ellipse in the y-axis direction, and α denotes a parameter.

In accordance with the sixth aspect of the present invention, the advantage of one of claims 3 to 5 is obtained and the coordinate conversion is accomplished through an elliptic-lens deformation.

In accordance with a seventh aspect of the present invention, the coordinate conversion section of one of claims 3 to 6 includes a coordinate converting unit to achieve a magnifying deformation to conduct an operation for coordinate conversion in accordance with $$x=cx+(x'-cx)X\text{xmag}$$

$$y=cy+(y'-cy)X\text{ymag}$$

where, (cx, cy) indicates coordinates of a center of magnification and xmag and ymag are magnifying factors in the x-axis and y-axis directions, respectively.

In accordance with the seventh aspect of the present invention, the advantage of one of claims 3 to 6 is attained and the coordinate values can be converted with a magnifying deformation.

In accordance with an eighth aspect of the present invention, the coordinate conversion section of one of claims 3 to 7 includes a coordinate converting unit to accomplish a ripple-shaped deformation to conduct an operation for coordinate conversion in accordance with $$r = \sqrt{(x' - cx)^2 + (y' - cy)^2}$$

$$dr1 = H\left(1 - \frac{r}{R}\right)\cos(fr) + H\left(1 - \frac{r}{R}\right)$$

$$dr2 = -H\cos(fr) + H\left(1 - \frac{r}{R}\right)\sin(fr) - \frac{H}{R}$$

$$x = x' + (dr1 + dr2)\frac{(x' - cx)}{r}$$

-continued $$y = y' + (dr1 + dr2)\frac{(y' - cy)}{r}$$

where, (cx, cy) denotes coordinates of a center of ripple, R stands for an effective radius, and H indicates a maximum amplitude.

In accordance with the eighth aspect of the present invention, the advantage of one of claims 3 to 7 is obtainable and the coordinate values can be converted through a ripple-shaped deformation.

In accordance with a ninth aspect of the present invention, the coordinate conversion section of one of claims 3 to 8 includes a coordinate converting unit to effect an eddy-shaped deformation to conduct an operation for coordinate conversion in accordance with $$r = \sqrt{(x' - cx)^2 + (y' - cy)^2}$$
$$\phi = G(r) \times \theta$$
$$x = x'\cos\phi - y'\sin\phi + R(1 - \cos\phi + \sin\phi)$$
$$y = x'\sin\phi + y'\cos\phi + R(1 - \sin\phi - \cos\phi)$$

where, (cx, cy) denotes coordinates of a center of eddy, R stands for an effective radius, and θ is a maximum rotation angle.

In accordance with the ninth aspect of the present invention, the advantage of one of claims 3 to 9 is attainable and the coordinates are converted through the eddy-shaped deformation.

In accordance with a tenth aspect of the present invention, the user parameter specifying means of one of claims 3 to 9 includes a partial deformation zone display section to display an image, representative point indicating means to indicate a start point and an end point of representative points in an image displayed on the display section to thereby produce a sequence of data including coordinates of representative points, and user parameter conversion section to convert the string data into a user parameter corresponding to the deformation pattern.

In accordance with the tenth aspect of the present invention, the advantage of one of claims 3 to 9 is obtained; furthermore, since the user can convert, by confirming the displayed partial deformation zone, the sequence of data attained by indicating the start and end points of representative points into a user parameter corresponding to the deformation pattern, it is possible to easily set user parameters with higher reliability.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 10:
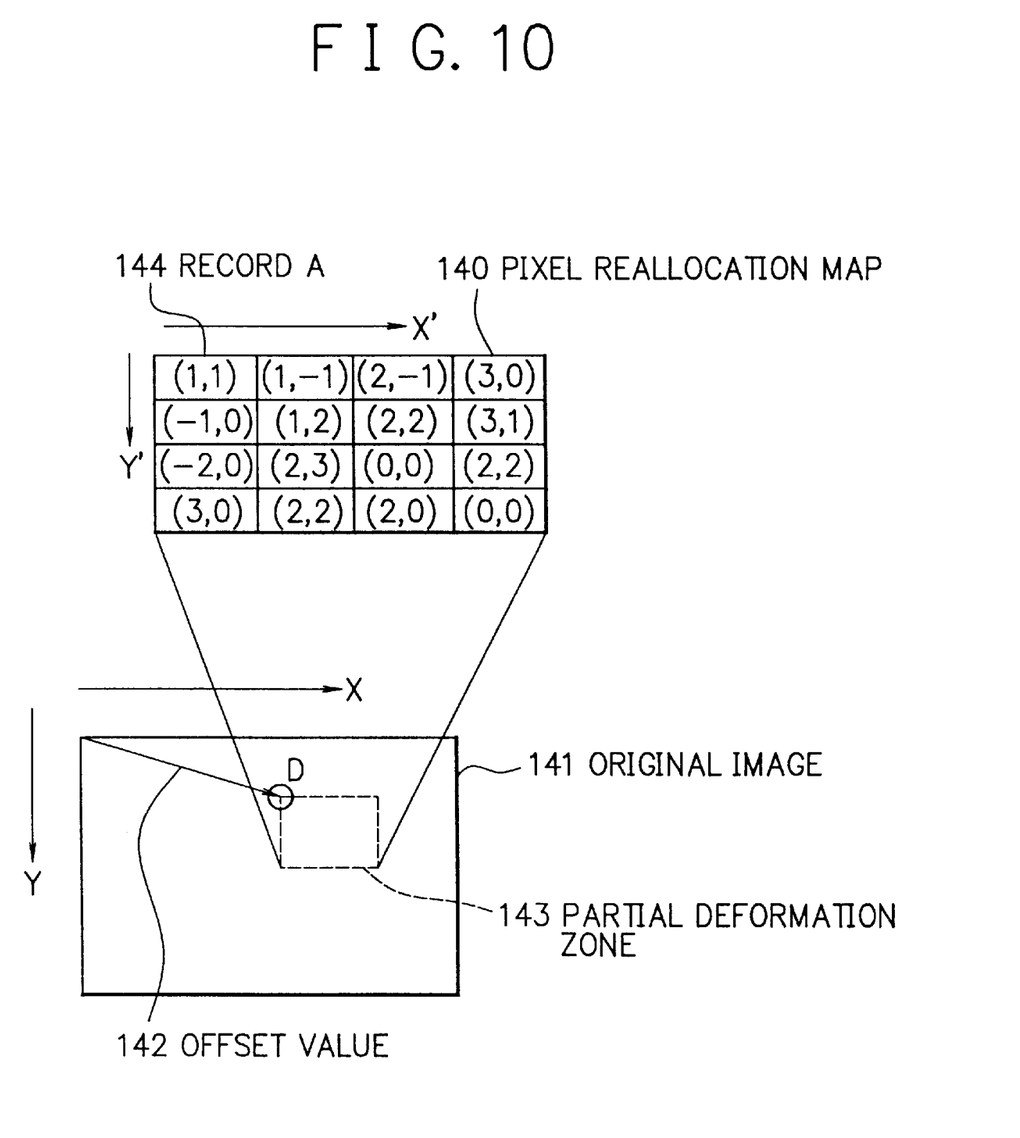
FIG. 10 is a diagram showing an example of the pixel reallocation map stored in the apparatus of FIG. 1.
Figure 11:
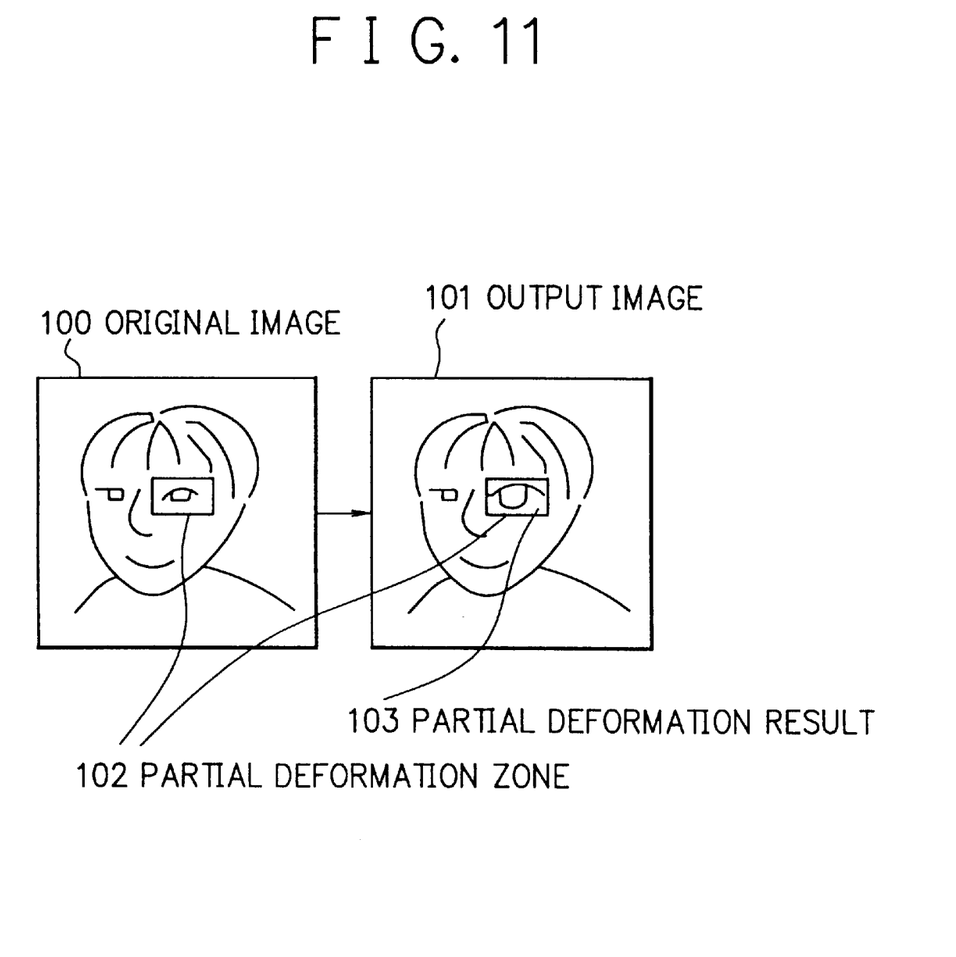
FIG. 11 is a diagram showing an example of image deformation accomplished by the apparatus of FIG. 1.
Figure 12:
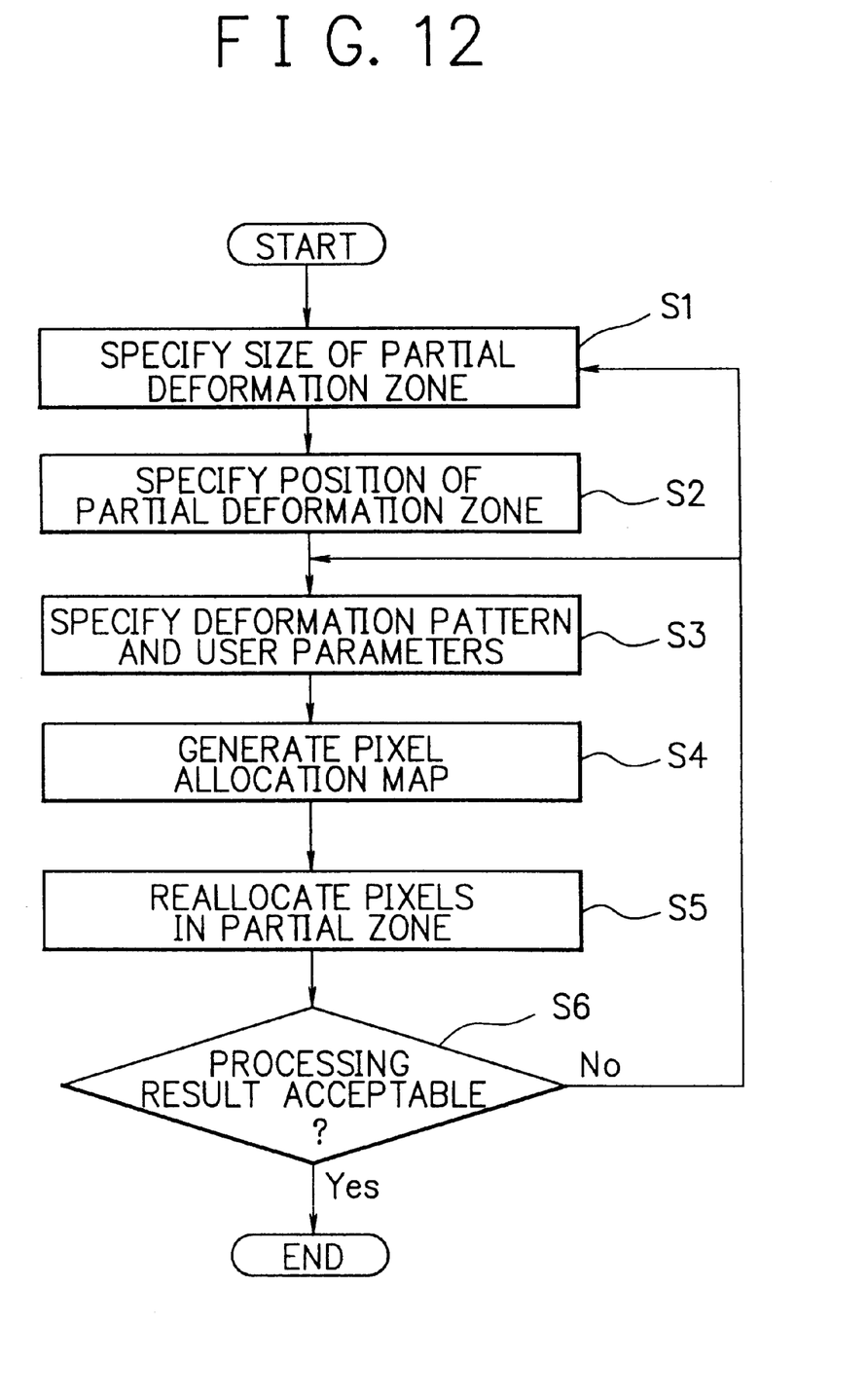
FIG. 12 is a flowchart showing an example of operation associated with the image deforming method and the image deforming apparatus in accordance with the present invention.

Referring next to FIGS. 10 to 12, description will be given of the principle of the image deforming method in accordance with the present invention. FIG. 11 shows an example of an image deforming operation conducted by an image deforming apparatus in accordance with the present invention.

In FIG. 11, an image of a human face is deformed in a display screen. Specifying a partial deformation zone or area 102 of an original image 100, the user conducts deformation to obtain a result of an output image 101 in which only the image of an eye, i.e., a partial deformation result 103 is magnified in the image.

To achieve the function in accordance with the present invention, the processing is executed in a procedure shown in FIG. 12. The flowchart of FIG. 12 is an example of operation related to the image deforming method and apparatus of the present invention.

First, the user specifies the size of the partial deformation zone (step 1) and then the position thereof (step 2).

The specifying operation steps above can be conducted through a graphical user interface displayed on the monitor by a pointing device such as a mouse or a tablet.

Subsequently, the user specifies a deformation pattern and user parameters (step 3). The deformation pattern to be generally utilized is a deformation with a polynomial of higher degree, an elliptic-lens deformation, a magnifying deformation, a ripple-shaped deformation, an eddy-shaped deformation, or the like. Each deformation requires several parameters in which those to be specified by the user are referred to as user parameters.

Next, there is generated an image reallocation map according to the deformation pattern (step 4). The map will be described later in detail.

The deforming operation is accomplished through reallocation of pixel values in the partial zone by referring to the reallocation map (step 5). Additionally, if the deformation result is regarded as acceptable (yes), the operation is terminated; otherwise (no), the processing is repeatedly executed beginning at the step of specifying the deformation region (step 6), thereby completing the operation.

The pixel reallocation map will be described by referring to FIG. 10. The map 140 is a 2-dimensional data array having a size of the partial deformation region 143 as an objective area of deformation Each record of the map 140 contains two values in the form of coordinates (dx, dy) to represent a relative distance to the coordinate values of a coordinate point at which a pixel value to be replaced after conversion is stored.

Next, a method of deforming an image will be described by referring to the reallocation map 140. It is assumed that an original image 141 is represented by x and y coordinate values as shown in FIG. 10 in which the upper-left corner indicates the origin (0, 0) and the direction to the right and the downward direction are associated with the x and y axes, respectively. Furthermore, the map 140 is expressed by a system of i and j coordinate values in which the upper-left corner is the origin (0, 0) of the coordinate system and the rightward and downward directions respectively represent the i and j axes.

In the image deforming operation of the apparatus in accordance with the present invention, the map 140 is superimposed onto the deformation zone 143 such that the deformation is conducted by referring to a record of the map 140 related to coordinates matching with each pixel.

Assume that the region 143 is specified at a position indicated by an offset value 142 and the upper-left point D of the region 143 is expressed as (0x, 0y). Namely, the coordinates (0x, 0y) designate the offset value 142. Superimposing the map 140 onto the partial deformation region 143 of the original image, the pixel coordinates P(x, y) of the region 143 in the original image are replaced with P' (x, y) in accordance with the following relationship.

$$P'(x,y)=P(x+dx\ (x-ox,y-oy)\ ,y+dy(x-ox,y-oy)) \tag{3}$$

P(x, y) indicates a pixel value of a pixel at a position represented by (x, y) in the original image and P' (x, y) designates a pixel value of the pixel at the same position expressed by (x, y) after the deformation of the original image. Coordinates dx(i, j) and dy(i, j) represent two record values at a position of (i, j) in the reallocation map.

It is assumed in FIG. 10 that record A 144 is superimposed onto point D. When point D is expressed as (100, 50), the pixel value of point D after conversion is obtained from expression (3), i.e., P'(100, 50)=P(100+1, 50+2) and hence the pixel value at (101, 52) is allocated thereto.

The pixel reallocation map 140 contains the relative distance of each pixel value to be replaced in the conversion as above. In consequence, the processing to refer to a new pixel value in accordance with the coordinate values obtained by adding the values of the map 140 to the coordinate values of the objective pixel of the original image is carried out in the partial deformation region 143.

Subsequently, description will be given of a method of generating the pixel reallocation map 140 in accordance with the deformation pattern.

In expression (3), the values of pixel P'(x, y) after deformation are equal to those of pixel P(x', y') at a point expressed by coordinates (x', y') which are indirectly specified by the map 140. Namely, the deformation is carried out as conversion from the coordinates (x, y) to the coordinates (x', y') as follows.

$$P'(x,y)=P(x',y')$$
$$x'=x+dx(x-ox,y-oy)$$
$$y'=y+dy(x-ox,y-oy) \tag{4}$$

In expression (4), dx and dy are derived as follows when there is known a relationship between the coordinate values (x, y) before deformation and those (x', y') after deformation.

$$dx=x'-x$$
$$dy=y'-y \tag{5}$$

Additionally, when (x, y) can be expressed by a transformation or conversion function of (x', y'), dx and dy are represented as functions of (x', y'). Therefore, when coordinates (x', y') are determined, dx and dy can be attained together with coordinates (x, y) before transformation. Values of dx and dy thus obtained are recorded in the pixel reallocation map 140.

Incidentally; (x, y) represented as a function of (x', y') is called a geometric transformation formula. Many geometric transformation formulae can be considered in association with deformation patterns.

For example, when a deformation with a polynomial of higher degree is selected as the deformation pattern, the following formula is used.

$$x = \sum_{i=0}^{m}\sum_{j=0}^{n} a_{ij}(x')^i(y')^j \tag{6}$$

$$y = \sum_{i=0}^{m}\sum_{j=0}^{n} b_{ij}(x')^i(y')^j$$

where, coefficients $a_{ij}$ and $b_{ij}$ are parameters and can be beforehand specified. Alternatively, the user may specify to input these parameters from a file.

When the elliptic-lens deformation is indicated as the deformation pattern, it is possible to use, for example, the following geometric transformation formula. In the formula. (cx, xc) denotes coordinates of the center of the lens, Ra and Rb are radii of the ellipse in the x-axis and y-axis directions, respectively.

$$x = n\times(cx+(x'-cx)\times t^2)+(1-n)\times x' \tag{7}$$
$$y = n\times(cy+(y'-cy)\times t^2)+(1-n)\times y'$$
$$t^2 = \frac{(x'-cx)^2}{R_a^2}+\frac{(y'-cy)^2}{R_b^2}$$
$$n = (1.0-t)\times\alpha \quad (t\geq 0)$$

where, (cx, xc) denotes coordinates of the center of the lens, Ra and Rb are radii of the ellipse in the x-axis and y-axis directions, respectively. Moreover, α indicates a parameter ranging from ?1 to +1. In the deforming operation, when α is positive, there is obtained a resultant image which can possibly attained through a convex lens: whereas, when α is negative, there is attained an image obtainable through a concave lens. When the elliptic-lens transformation is effected entirely for the partial deformation zone. (cx, cy) designates coordinates of the center of the deformation zone and Ra and Rb are respectively half the width and half the height of the zone. In this situation, the user need only specify the quantity of deformation α.

Moreover, when the magnifying deformation is specified as the deformation pattern, it is possible to utilize, for example, a geometric conversion formula as follows.

$$x = cx + (x' - cx)^{xmag}$$
$$y = cy + (y' - cy)^{ymag} \quad (8)$$

where, (cx, cy) denotes the center of magnification and xmag and ymag respectively stand for magnifying factors in the x-axis and y-axis directions.

When the magnifying deformation is carried out in the overall area of the partial deformation zone, (cx, cy) is attained as coordinates of the center of the zone. On this occasion, the user specifies xmag and ymag as user parameters. In a case in which the ripple-shaped deformation is selected as the deformation pattern, the user can select, for example, the following geometric transformation formula.

$$r = \sqrt{(x'-cx)^2 + (y'-cy)^2} \quad (9)$$
$$dr1 = H\left(1 - \frac{r}{R}\right)\cos(fr) + H\left(1 - \frac{r}{R}\right)$$
$$dr2 = -H\cos(fr) + H\left(1 - \frac{r}{R}\right)\sin(fr) - \frac{H}{R}$$
$$x = x' + (dr1 + dr2)\frac{(x'-cx)}{r}$$
$$y = y' + (dr1 + dr2)\frac{(y'-cy)}{r}$$

where, (cx, cy) represents the center of the ripple, R stands for an effective radius, w indicates the number of waves in an area of the effective radius, and H designates a maximum amplitude of the wave.

When the ripple-shaped deformation is accomplished entirely for the deformation zone, (cs, cy) is attained as coordinates of the center of the zone and R is obtained as half the length of a shorter side of the zone, for example. In this case, it is only necessary to specify the number of waves w and the amplitude H as user parameters.

If the eddy-shaped deformation is designated as the deformation pattern, it is possible to employ, for example, a geometric transformation formula as follows.

$$r = \sqrt{(x'-cx)^2 + (y'-cy)^2} \quad (10)$$
$$\phi = G(r) \times \theta$$
$$x = x'\cos\phi - y'\sin\phi + R(1 - \cos\phi + \sin\phi)$$
$$y = x'\sin\phi + y'\cos\phi + R(1 - \sin\phi - \cos\phi)$$

wherein, (cx, cy) indicates the center of eddy, R stands for an effective radius, and θ denotes a maximum rotation angle. Moreover, G(r) is a function of r, which can be expressed, for example, as follows.

$$G(r) = C \cdot \frac{R-r}{R} \quad (11)$$
$$G(r) = C \cdot (R-r)^2 \left(1 - \frac{R-r}{R}\right) \quad (12)$$

where, C indicates an arbitrary coefficient.

When the eddy-shaped deformation is achieved wholly in the deformation zone, (cs, cy) is attained as coordinates of the center of the zone and R is obtained as half the length of a shorter side of the zone, for example. In this operation, the user is required only to specify θ as the user parameter.

With provision of the operation above, there can be provided an image deforming method and an image deforming apparatus in which a portion of an image input thereto is deformed to be outputted therefrom at a high speed.

When the eddy-shaped deformation is achieved wholly in the deformation zone, (cs, cy) is attained as coordinates of the center of the zone and R is obtained as half the length of a shorter side of the zone, for example. In this operation, the user is required only to specify θ as the user parameter.

With provision of the operation above, there can be provided an image deforming method and an image deforming apparatus in which a portion of an image input thereto is deformed to be outputted therefrom at a high speed.

Figure 1:
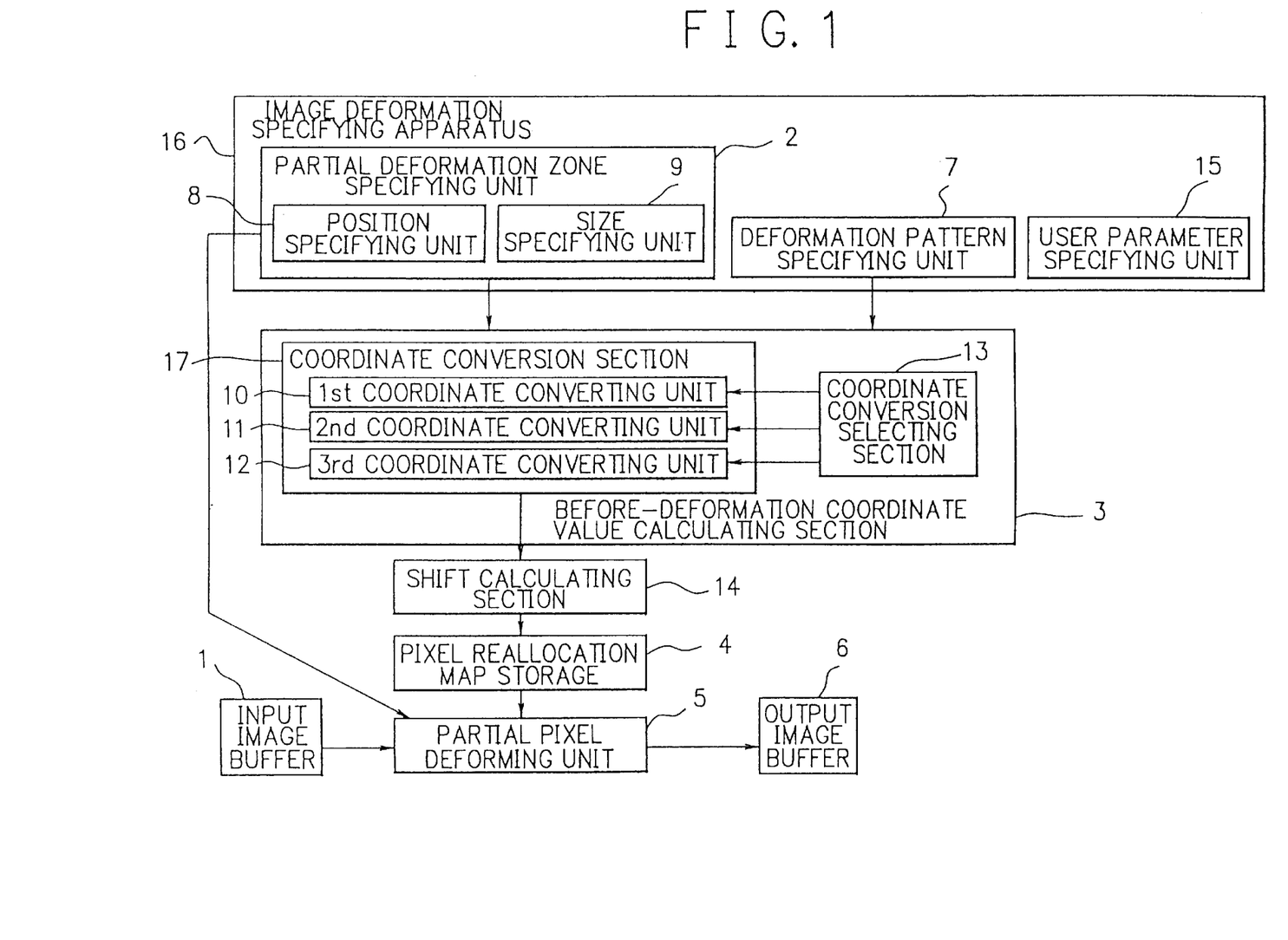
FIG. 1 is a schematic block diagram showing an embodiment of an image deforming apparatus in accordance with the present invention.

Referring next to the drawings, description will be given in detail of an embodiment of the image deforming apparatus in accordance with the present invention. FIG. 1 shows in a block diagram the configuration of an embodiment of the image deforming apparatus of the present invention.

The system of FIG. 1 includes an image deformation specifying apparatus 16 to specify a deformation zone, a deformation pattern, and parameters for the pattern, a before-deformation coordinate value calculating section 3 to calculate before-deformation coordinate values for each pixel of the deformed image according to the deformation pattern, a shift calculating section to calculate an amount of shift of the pertinent pixel in terms of difference in coordinates before and after transformation, a pixel reallocation map storage 4 to store the calculated amount of shift, an input image buffer 1 to keep therein image data inputted thereto, an output image buffer 6 to store therein output image data, and a partial pixel deforming section 5 to transfer, while deforming image data stored in the input image buffer 1, the deformed image data to the output image buffer 6.

The deformation specifying section 16 includes a partial deformation zone specifying unit 2 to specify a position and a size of the partial zone, a deformation pattern specifying unit 7 to designate a deformation pattern, and a user parameter specifying unit 15 to specify parameters for the pattern. The unit 2 further includes a position specifying unit 8 and a size specifying unit 9.

The coordinate value calculating section 3 includes a coordinate conversion section 17 including first to n-th coordinate converting units 10 to 12 and a coordinate conversion selecting section 13 to select one of the units 10 to 12 for the conversion.

Figure 2:
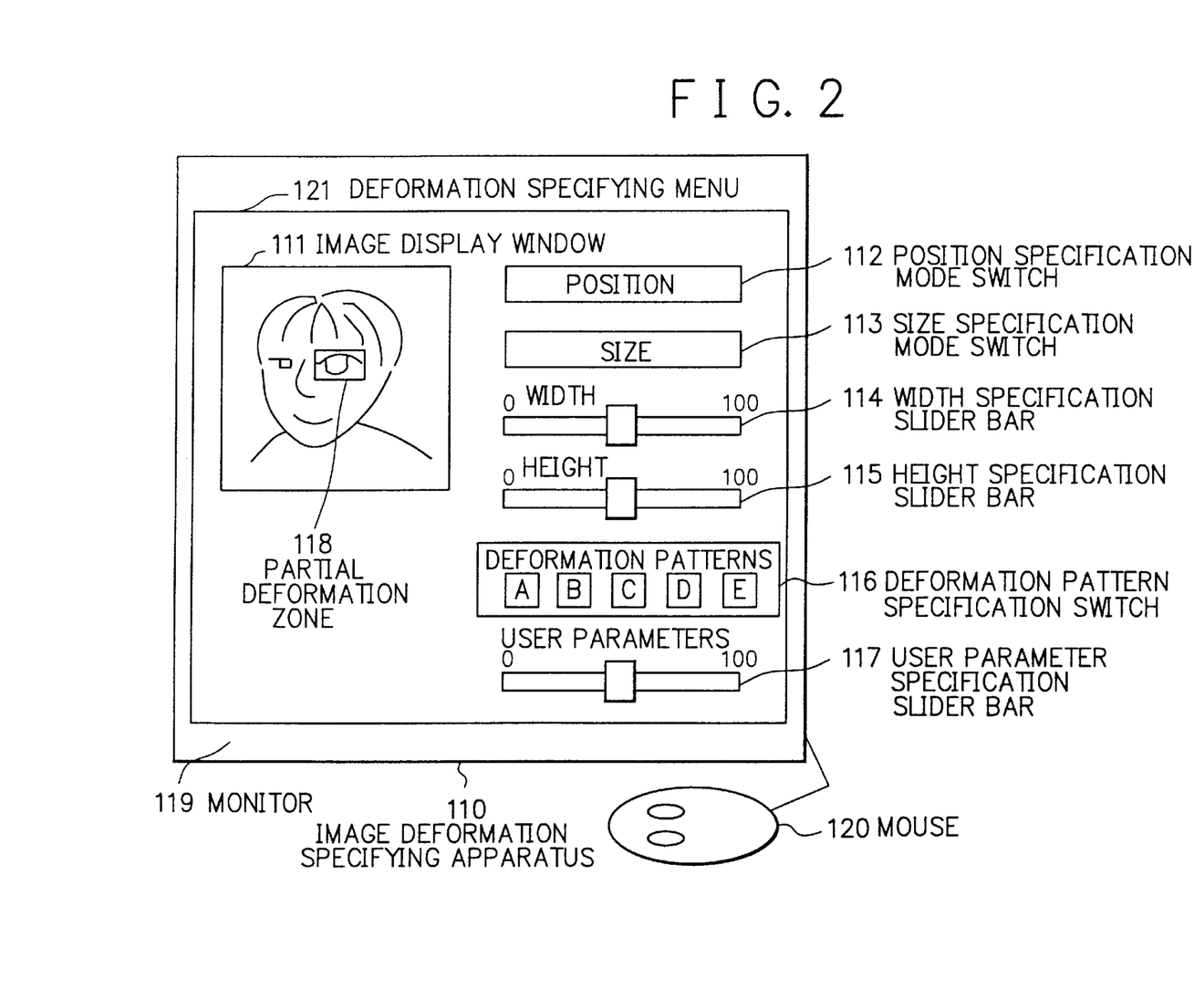
FIG. 2 is a diagram showing an example of an operation menu supported by the apparatus of FIG. 1.

FIG. 2 shows an example of the specifying section 16, which includes a monitor 119 and a mouse 120 as pointing devices. Displayed on the monitor 119 is a deformation specifying menu serving as a graphical user interface.

The menu 121 includes an image display window 111, a position specification mode switch 112 to execute specification of a position, a size specification mode switch 113 to start specification of a size, a width specification slider bar 114 to specify a width, a height specification slider bar 115 to denote a value of height, a deformation pattern specification switch 116 to execute specification of a deformation pattern, and a user parameter specification slider bar 117 to designate user parameters.

In relation to the apparatus 110 of FIG. 2 and that shown in FIG. 1, the partial deformation region specifying unit 2 of FIG. 1 corresponds to a combination of the window 111, the position and size mode switches 112 and 113, and the width and height slider bars 114 and 115. Moreover, the user parameter specifying unit 15 of FIG. 1 is associated with the user parameter slider bar 117 of FIG. 2.

Subsequently, description will be given of operation of the image deforming apparatus of the embodiment. First, operating the apparatus 16, the user specifies information of a deforming location and deformation pattern, specifically, a position in an image, a size of a deformation zone, a deformation pattern, and parameters for the pattern.

Description will now be given of an operation to designate the partial deformation zone 118 in the specifying apparatus 110 shown in FIG. 2. The user first sets the size switch 113, for example, by clicking the mouse 120. In this situation, a rectangle indicating the zone 118 is presented at an initial position in the window 111.

Next, the user adjusts the width and height slider bars 114 and 115 to set the size of the zone 118.

Turning the position mode switch 112 on, the user moves by the mouse 120 the rectangle of the zone 118 in the window 111 to establish the position of the zone 118.

Figure 3:
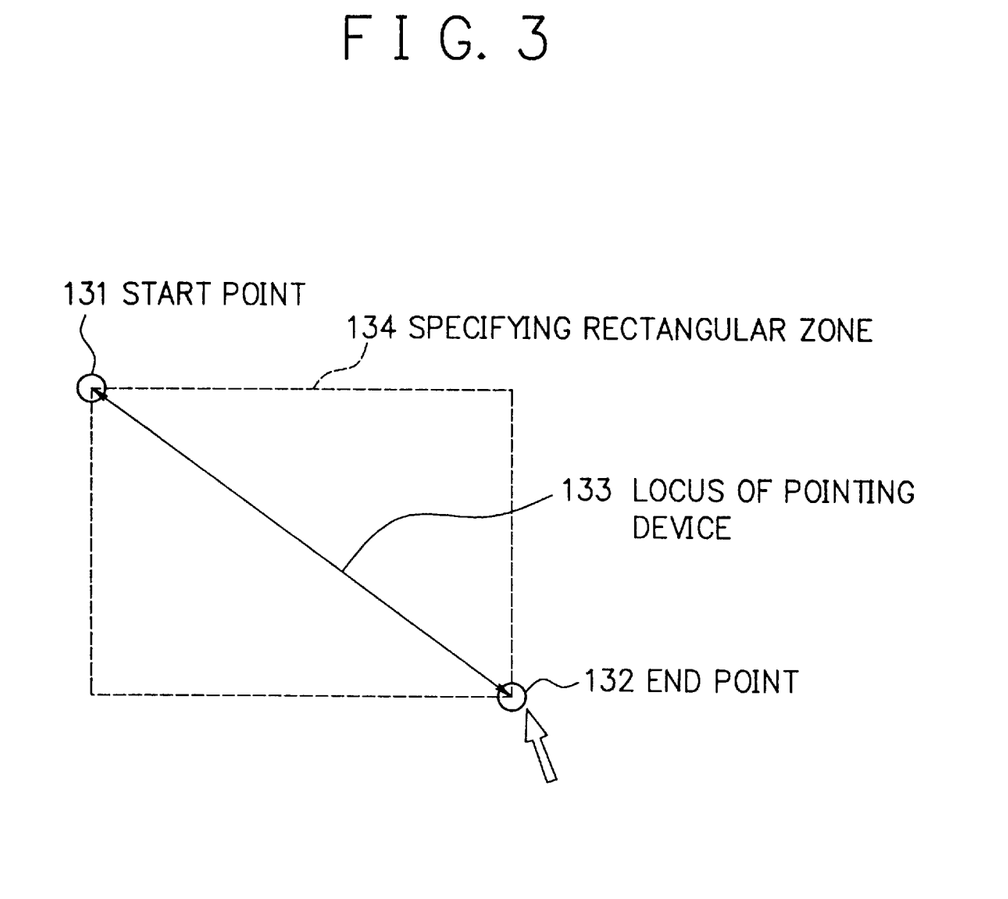
FIG. 3 is a diagram showing an example of the method of specifying a partial deformation zone in the apparatus of FIG. 1.

In this case, the size and the position of the zone 118 may be specified by dragging the mouse 120 in an inclined or diagonal direction. FIG. 3 shows the specifying operation. Namely, the user depresses a mouse button at a start point 131 and then drags the mouse 120 along a line of trace 133 with the button kept depressed to thereby specify the size of the zone 134.

Although the mouse 120 is employed as the pointing device in this embodiment, it is also possible to use another pointing device such as a tablet, a keyboard, or the like.

After the position and the size of the zone 134 are completely established as above, the user designates a deformation pattern to deform the zone 134. The deforming operation is carried out by the deformation pattern specifying unit 7 shown, in FIG. 1.

As described above, the unit 7 of FIG. 1 corresponds to the pattern specification switch 116 of FIG. 2. Although FIG. 2 includes only five deformation patterns, the present invention is not restricted by this embodiment. The patterns include a polynomial deformation, an elliptic-lens deformation, a magnifying deformation, a ripple-shaped deformation, an eddy-shaped deformation, and the like. The user selects one of the patterns.

After the deformation pattern is selected, the user specifies parameters for the selected pattern. The operation is conducted by the user parameter specifying unit 15 of FIG. 1. The unit 15 shown in FIG. 1 corresponds to the user parameter slider bar 117 of FIG. 2 as described above.

In this embodiment, the user operates the slider bar 17 to specify user parameters in association with the deformation pattern. When there are required a plurality of user parameters, it is only necessary to provide a plurality of switches in the specifying unit 15.

The specifying unit 15 is not limited to the slider bar 117 shown in FIG. 2. It may also be possible to arrange a device to directly indicate a specification item on the display window 111.

Figure 4:
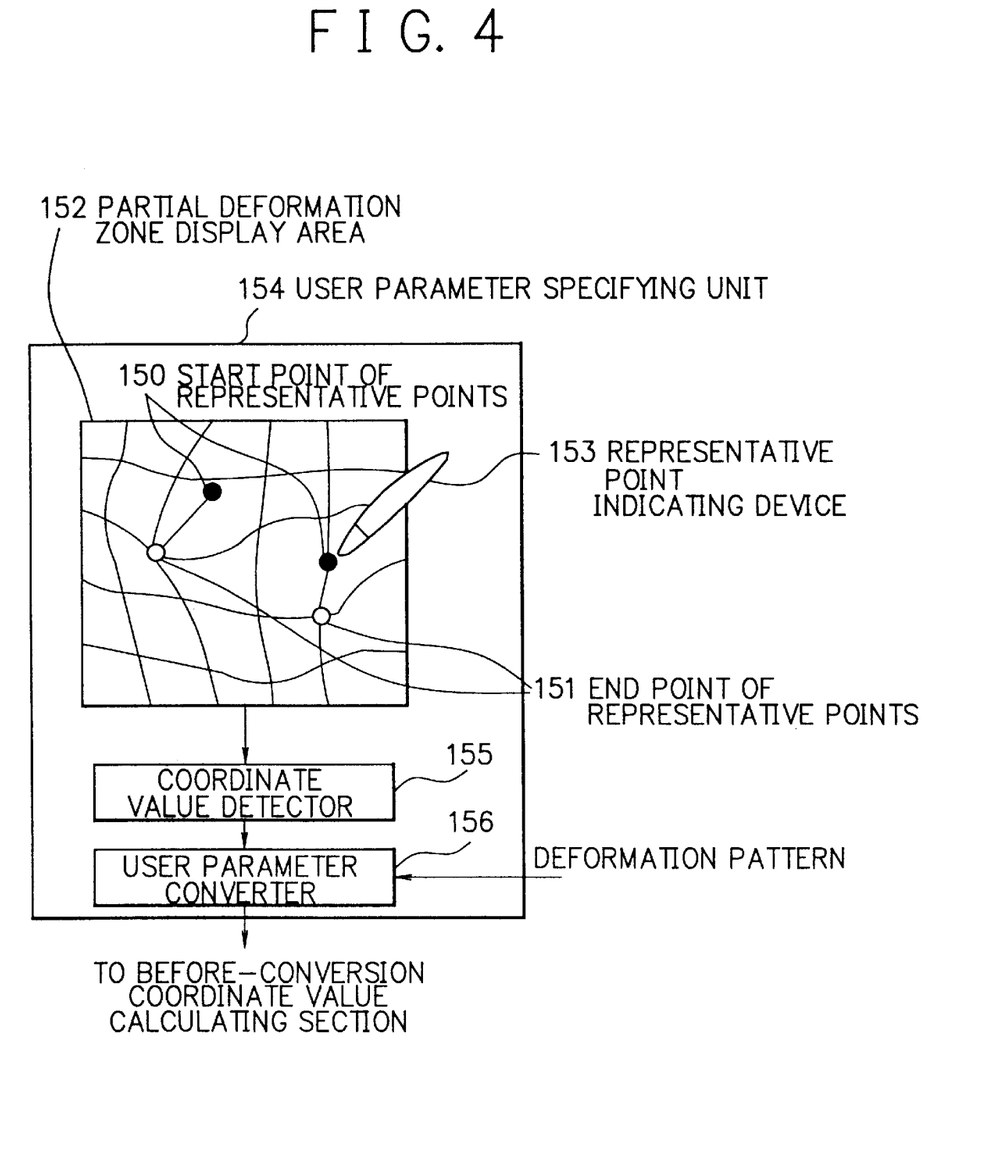
FIG. 4 is a diagram showing an example of the method of specifying a user parameter in the apparatus of FIG. 1.

Referring to FIG. 4, description will be given of the device to be disposed for the direct indication on the window 111. As can be seen from FIG. 4 showing a display state of the user parameter specifying:unit 154, an image of the partial deformation zone 118 is presented in the partial deformation zone display area 152. The user specifies a start point 150 mouse and then an end point 151 of representative points by a representative point indicating unit 153. In the operation, the specifying unit 15 shown in FIG. 1 corresponds to a combination of the display area 152 and the indicating unit 153 of FIG. 4. The indicating unit 153 may be a pointing device such as a mouse, a tablet, an electronic pen, or the like.

The sequence or string of coordinates specified in the display area 152 are detected by a coordinate value detecting section 155 and then are outputted to a user parameter converting section 156. According to the specified deformation pattern, the section 156 calculates user parameters for the deformation in accordance with the coordinate values of the start and end points of the representative points. This operation is conducted as follows, for example. The sequence of coordinate values of the start and end points are assigned to a geometric deformation formula to solve a simultaneous system of equations.

Therefore, the user parameters can be specified in the procedure shown in FIG. 4.

When the user parameters are completely specified, the before-conversion coordinate value calculating section 3 shown in FIG. 1 starts its operation. For the converted coordinate values of each pixel in the zone 118 specified by the unit 16, this section 3 calculates before-conversion coordinate values of an original pixel associated with the pertinent pixel.

The calculation of coordinate values of the original pixel will be next described. The selecting unit 13 of the calculating section 3 first selects and activates one of the converting units to be invoked by the specified deformation pattern. The conversion section 13 includes n modules (n is an integer equal to or more than 1). e.g., the first converting unit 10, the second converting unit 11, and so on.

Description will be given of processing in each converting unit. When coordinates (x, y) are assumed to be transformed into coordinates (x', y'), the associated image deformation can be represented as (x', y')=F(x, y). If there exists a function $F^{-1}$ for which (x, y)=$F^{-1}$(x', y') holds, the original coordinates can be obtained for the transformed coordinates of the pixel in the zone by assigning the coordinates (x', y') of the converted pixel to $F^{-1}$.

For example, there exists the function F−1 for the higher-degree polynomial deformation, the elliptic-lens deformation, the magnifying deformation, the ripple-shaped deformation, and the eddy-shaped deformation. The functions can be represented by expressions (6) to (10), respectively.

Figure 5:
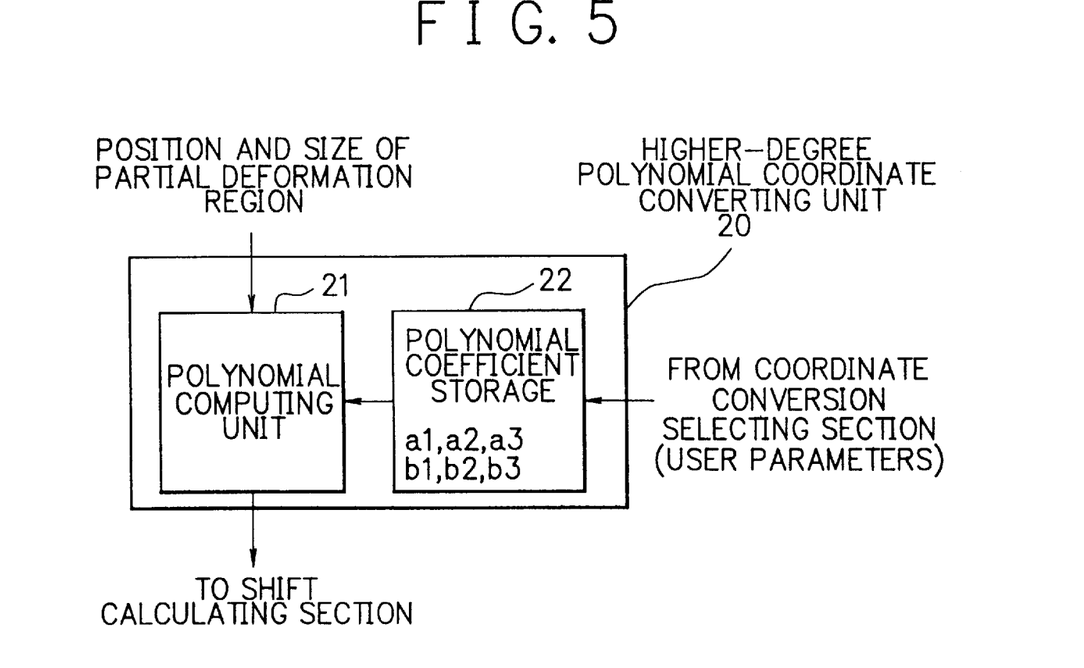
FIG. 5 is a block diagram showing the coordinate conversion section using a polynomial of higher degree in the apparatus of FIG. 1.

FIG. 5 shows in a block diagram of a coordinate converting unit 20 to achieve the transformation according to a polynomial of higher degree. Supplied as a user parameter to the unit 20 is a sequence of coefficients of the polynomial. The coefficients are stored in a polynomial coefficient storage 22. In a polynomial calculation unit 21, an arithmetic operation is conducted in accordance with expression (6). The unit 21 is an electronic circuit or a programmed microcomputer, which reads the user parameters and the size and position of the partial deformation zone to accomplish the calculation of before-deformation coordinate values in accordance with expression (6).

Figure 6:
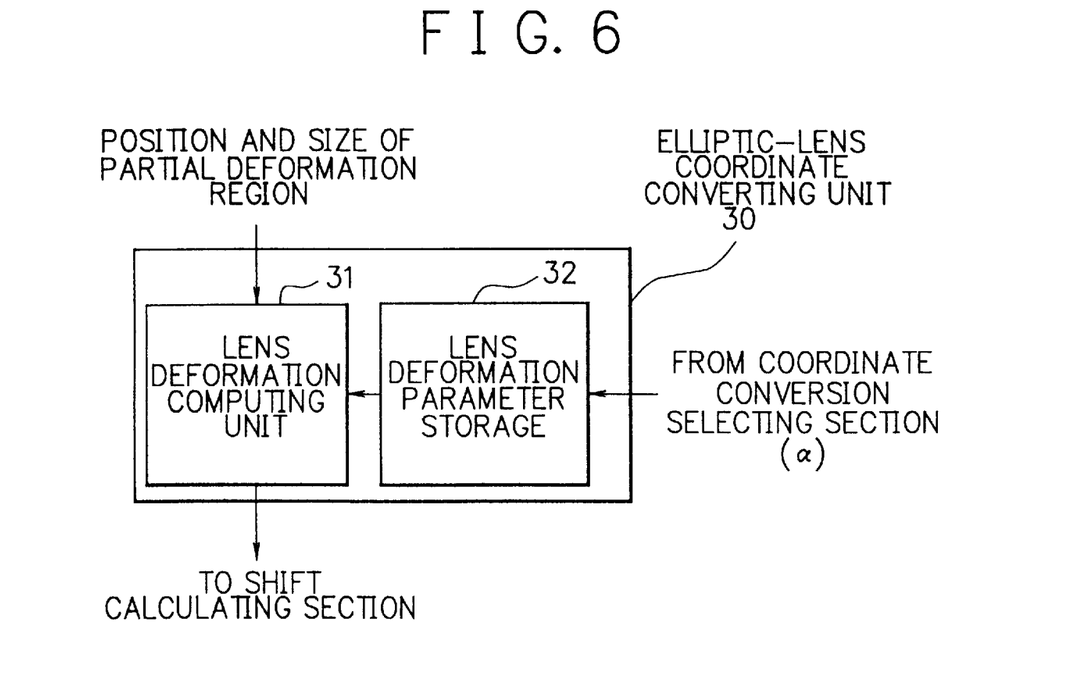
FIG. 6 is a block diagram showing the coordinate conversion section achieving an elliptic-lens deformation in the apparatus of FIG. 1.

FIG. 6 is a block diagram showing a coordinate converting unit 30 to carry out the elliptic-lens deformation. User parameter α of expression (7) is supplied to the unit 30. The parameter is stored in a lens deformation parameter storage 32. The unit 30 includes a lens deformation unit 31 which executes an arithmetic operation in accordance with expression (7). The unit 31 is an electronic circuit or a programmed microcomputer, which reads the user parameter and the size and position of the partial deformation zone to thereby conduct the calculation of before-deformation coordinate values in accordance with expression (7).

Figure 7:
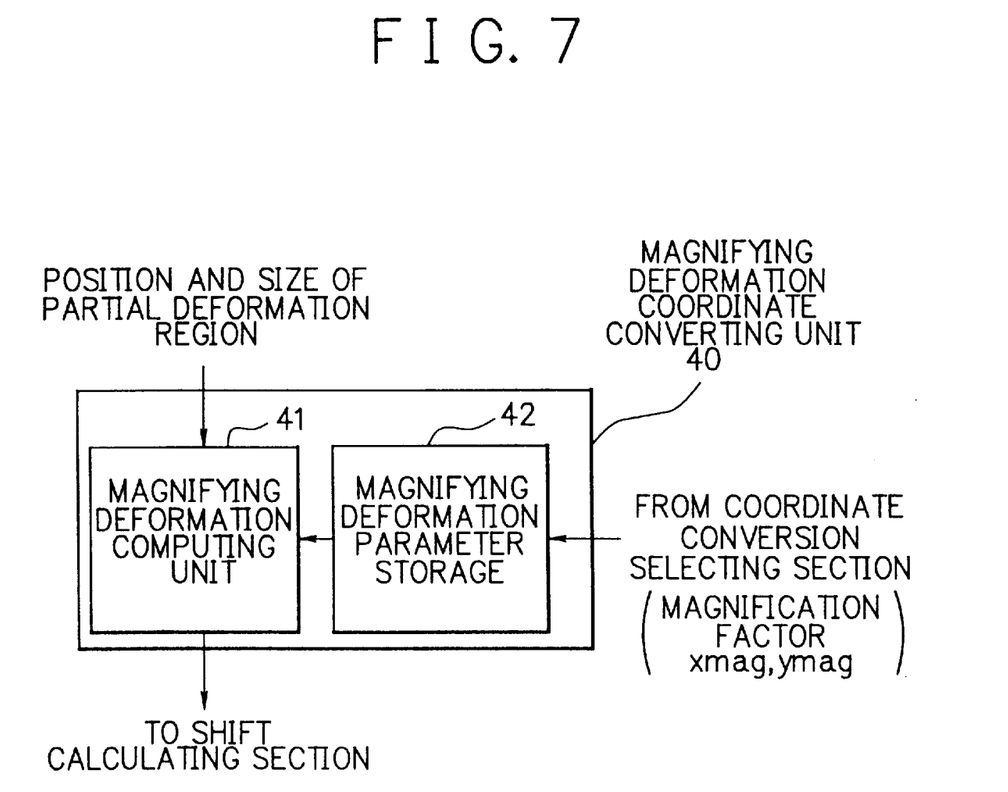
FIG. 7 is a block diagram showing the coordinate conversion section achieving a magnifying deformation in the apparatus of FIG. 1.

In FIG. 7, there is shown a block diagram of a coordinate converting unit 40 to achieve the magnifying transformation. Supplied to the unit 40 are user parameters, i.e., xmag and ymag of expression (8) to be stored in a magnifying deformation parameter storage 42. The unit 40 includes a magnifying deformation unit 41 to execute a calculation in accordance with expression (8). As the unit 41, there may be adopted an electronic circuit or a programmed microcomputer, which receives as inputs thereto the user parameters and the size and position of the partial deformation zone to accomplish calculation of the before-deformation coordinate values in accordance with expression (8).

Figure 8:
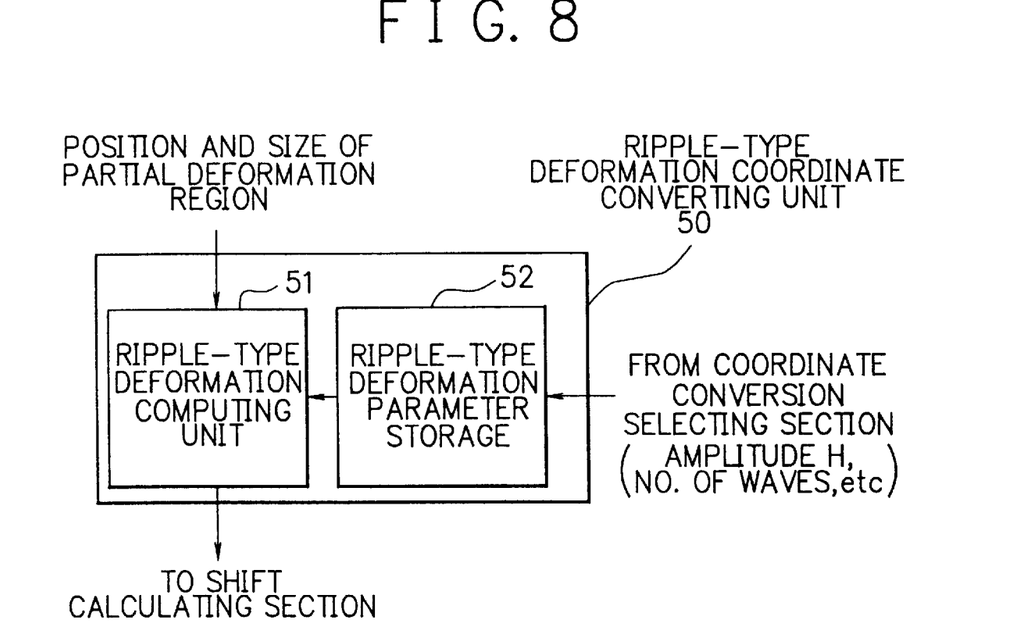
FIG. 8 is a block diagram showing the coordinate conversion section achieving a ripple-shaped deformation in the apparatus of FIG. 1.

FIG. 8 shows a block diagram of a coordinate converting unit 50 for achieving the ripple-shaped deformation. As user parameters, values of H and w of expression (8) are inputted to the unit 50. The parameters are stored in a ripple-shaped deformation parameter storage 52. In the unit 50, there is included a ripple-shaped deformation unit 52 to effect a calculation in accordance with expression (9). The unit 51 is an electronic circuit or a programmed microcomputer. Reading the user parameters and the size and position of the partial deformation zone, the unit 51 calculates the before-deformation coordinate values in accordance with expression (9).

Figure 9:
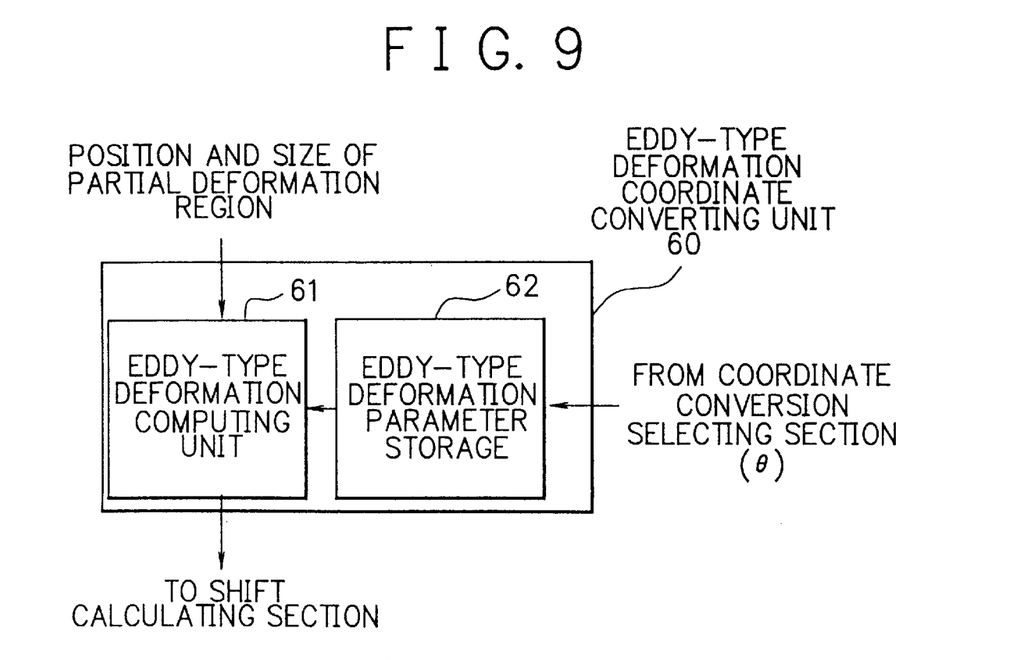
FIG. 9 is a block diagram for explaining the coordinate conversion section achieving an eddy-shaped deformation in the apparatus of FIG. 1.

FIG. 9 is a block diagram showing a coordinate converting unit 60 to carry out the eddy-type deformation. User parameter of expression (10) is inputted to the unit 60. The parameter is kept in an eddy-shaped deformation parameter storage 62. The unit 60 includes an eddy-shaped deformation unit 61 which executes an arithmetic operation in accordance with expression (10). It may be employed as the unit 61 an electronic circuit or a programmed microcomputer, which reads the user parameters and the size and position of the partial deformation zone to thereby conduct the calculation of before-deformation coordinate values in accordance with expression (10).

After the original coordinates (x', y') of the before-conversion image are calculated for the coordinates (x, y) of each pixel of the after-conversion image in the partial deformation zone through the operation of the coordinate converting unit, the value of shift of each pixel in the zone is obtained by the shift calculating section 14 to be stored in the pixel reallocation map storage 4. The shift of each pixel indicates a record value stored in the map 140. The quantity of shift. i.e., (dx, dy) can be attained in accordance with expression (5).

When the amount of shift expressed in terms of coordinates are obtained for each pixel and are stored in the map storage 4, the partial pixel deforming unit 5 conducts an actual deforming operation in accordance with the position of the partial deformation zone and the data stored in the map storage 4. In the deformation, the output image buffer 6 is sequentially scanned such that for any pixel outside the deformation zone, the pixel value at the same coordinate position of the input image buffer 1 is directly copied onto the output buffer 6.

For each pixel in the deformation zone, a record (dx, dy) at the pertinent coordinate position of the map storage 4 is inspected or checked such that a pixel value of the input buffer 1 at a coordinate position apart from the pertinent coordinate position by a distance of (dx, dy) is copied onto the output buffer 6.

Consequently, in accordance with this embodiment, even when the deformation processing is executed only in a portion of an image, the deformation region can be easily set and changed. Moreover, since the deformation is carried out only for the deformation zone, the processing time is considerably minimized as compared with a case in which the deformation is accomplished for all pixels. With this provision, the overall operation time can be reduced.

When the user checks the results of deforming operation and detects unsatisfactory items therein, it is possible to specify again parameters by the pixel deformation specifying unit 16 to carry out the deformation again. Namely, since the user can continuously accomplish the operation to attain appropriate results, the image deformation can be exactly achieved at a high speed.

Thanks to the image deforming apparatus in accordance with the present invention, there is obtained an advantageous effect that the image deformation is conducted only in a portion of an image, i.e., in a partial deformation zone. This means that the arithmetic operation of coordinate transformation is required to be effected only for the pixels in the partial deformation zone, which results in a high-speed deformation. Moreover, there can be provided an image deforming method and an image deforming apparatus capable of easily achieving, for example, the lens-type and eddy-type deforming operations, which have been quite difficult in the prior art.

Additionally, once a pixel reallocation map is generated for the partial deformation region, it is possible, when only the position of the partial deformation region is moved thereafter, to use the map without any modification thereof. Due to the provision, the calculation for the coordinate conversion can be dispensed with and the image deformation can be conducted at quite a high speed, which allows the user to easily conduct the try-and-error procedure in the image deformation. There is consequently provided an image deforming method and an image deforming apparatus in which the efficiency of the image editing operation is considerably increased.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image deforming apparatus, comprising:

an input image buffer for keeping input image data;

an output image buffer for keeping output image data;

an image deformation specifying unit for specifying an image deforming method and a partial deforming zone, including partial deformation region specifying means including position specifying means for specifying a position in an image in the partial deformation region and size specifying means for specifying a size of the region, deformation pattern specifying means for specifying a deformation pattern selected from a plurality of deformation patterns, each of the patterns representing a deformation method of the image, and user parameter specifying means for specifying as user parameters deformation parameters of the specified deformation pattern;

a before-deformation coordinate value calculating section for calculating coordinate values of each pixel before the deformation for the output image, including a coordinate conversion unit for conducting, when before-deformation coordinates (x,y) are moved to coordinates (x',y') after the deformation, a coordinate conversion represented by $F^{-1}$ for which $(x,y)=F^{-1}(x', y')$ holds;

a shift calculating section for calculating a quantity of coordinates representing a quantity of shift between coordinate values of each pixel of the output image and those of the pixel before the deformation;

a pixel reallocation map storage section for keeping therein the shift of coordinates in the form of a pixel reallocation map; and partial pixel deforming means for reallocation pixels in accordance with the quantity of coordinate shift stored in the storage section and transfer values of the pixels from the input image buffer to the output image buffer.

2. An image deforming apparatus in accordance with claim 1, wherein
the coordinate conversion units of the before-deformation coordinate value calculating section include first to n-th code conversion units (n is an integer equal to or more than 1) respectively accomplishing image deforming operations respectively corresponding to the specifiable deformation patterns, and
the before-deformation coordinate value calculating section includes a coordinate conversion selecting section for selecting, in response to an indication from the deformation pattern specifying means, either one of the first to n-th coordinate conversion units.

3. An image deforming apparatus in accordance with claim 1, wherein the coordinate conversion units include a coordinate conversion unit using a higher-degree polynomial for conducting a coordinate conversion in accordance with;

$$x = \sum_{i=0}^{m} \sum_{j=0}^{n} (a_{ij}(x'))^i (y')^j$$

$$y = \sum_{i=0}^{m} \sum_{j=0}^{n} (b_{ij}(x'))^i (y')^j.$$

4. An image deforming apparatus in accordance with claim 1, wherein the coordinate conversion units include a coordinate conversion unit achieving an elliptic lens deformation for conducting a coordinate conversion in accordance with;

$$x = n \times (cx + (x' - cx) \times t^2) + (1 - n) \times x'$$

$$y = n \times (cy + (y' - cy) \times t^2) + (1 - n) \times y'$$

$$t^2 = \frac{(x' - cx)^2}{R_a^2} + \frac{(y' - cy)^2}{R_b^2}$$

$$n = (1.0 - t) \times \alpha \quad (t \geq 0)$$

where, (cx, cy) indicates coordinates of a center of the lens, Ra is a radius of the ellipse in an x-axis direction, Rb is a radius of the ellipse in a y-axis direction, and α denotes a parameter.

5. An image deforming apparatus in accordance with claim 1, wherein the coordinate conversion units include a coordinate conversion unit achieving a magnifying deformation for conducting a coordinate conversion in accordance with $$x = cx + (x' - cx) X \text{xmag}$$

$$y = cy + (y' - cy) X \text{ymag}$$

where, (cx, cy) indicates coordinates of a center of magnification and xmag and ymag denote magnification factors in the x-axis and y-axis directions, respectively.

6. An image deforming apparatus in accordance with claim 1, wherein the coordinate conversion units includes a coordinate conversion unit achieving a ripple-type deformation for conducting a coordinate conversion in accordance with $$r = \sqrt{(x' - cx)^2 + (y' - cy)^2}$$

$$dr1 = H\left(1 - \frac{r}{R}\right)\cos(fr) + H\left(1 - \frac{r}{R}\right)$$

$$dr2 = -H\cos(fr) + H\left(1 - \frac{r}{R}\right)\sin(fr) - \frac{H}{R}$$

$$x = x' + (dr1 + dr2)\frac{(x' - cx)}{r}$$

$$y = y' + (dr1 + dr2)\frac{(y' - cy)}{r}$$

where, (cx, cy) indicates coordinates of a center of the ripple, fr is a ripple shape parameter, R stands for an effective radius, and H is a maximum amplitude of waves.

7. An image deforming apparatus in accordance with claim 1, wherein the coordinate conversion units include a coordinate conversion unit achieving an eddy-type deformation for conducting a coordinate conversion in accordance with $$r = \sqrt{(x' - cx)^2 + (y' - cy)^2}$$

$$\phi = G(r) \times \theta$$

$$x = x'\cos\phi - y'\sin\phi + R(1 - \cos\phi + \sin\phi)$$

$$y = x'\sin\phi + y'\cos\phi + R(1 - \sin\phi - \cos\phi)$$

where, (cx, cy) indicates coordinates of a center of the eddy, R represents an effective radius, and θ is a maximum rotation angle.

8. An image deforming apparatus in accordance with claim 1, wherein the user parameter specifying means includes:

a partial deformation region display section for displaying thereon an image;

representative point indicating means for indicating a start point and an end point of representative points in an image displayed on the display section and producing therefrom data of coordinates of a sequence of representative points; and a user parameter conversion section for converting the data of representative point coordinates into user parameters corresponding to the deformation pattern.

* * * * *